Patented Apr. 6, 1943

2,315,499

UNITED STATES PATENT OFFICE 2,315,499

PRODUCTION OF PARAFFIN-OLEFIN MIXTURES

Adolf Cantzler and Hans Krekeler, Mannheim, Germany, assignors to Standard Catalytic Company, a corporation of Delaware No Drawing. Application December 12, 1939, Serial No. 308,826. In Germany October 26, 1938

4 Claims. (Cl. 260—683)

The present invention relates to the production of paraffin-olefin mixtures.

In the preparation of alcohols, chloro-hydrocarbons, diolefins and olefin polymerization products the initial materials are often paraffin-olefin mixtures such as occur for example naturally or are obtained by technical processes, as for example the hydrogenation of coals. Thus secondary butyl alcohol is obtained by treating normal butylene-normal butane mixtures with sulphuric acid, or dichloroparaffins are obtained by adding on chlorine to the olefins contained in such gas mixtures. Such mixtures are also obtained from pure paraffins or hydrocarbon mixtures having a high content of paraffins and a low content of olefins by dehydrogenation. The method hitherto used for this purpose consists in incompletely dehydrogenating the paraffins or paraffin-containing hydrocarbon mixtures by treatment at elevated temperature, in particular in the presence of catalysts. If the temperatures during such dehydrogenations are chosen too high, there is a danger that by-products having a lower number of carbon atoms than the initial hydrocarbons may be formed. Furthermore, the catalysts, which work satisfactorily at first, lose their activity in continuous operation so that the yields are reduced.

We have now found that paraffin-olefin mixtures having a high olefin content can be obtained by incomplete dehydrogenation of paraffins, which may already be admixed with a certain amount of olefins, while avoiding the said drawbacks by exposing these hydrocarbons to be incompletely dehydrogenated to temperatures above 500° C. in the presence of hydrogen halide, in particular hydrogen chloride.

It is possible to start from pure hydrocarbons, as for example propane, normal butane or normal pentane, or also from mixtures of these paraffins with olefins of the same carbon number and to increase the olefin content thereof by dehydrogenation of a part of the paraffin hydrocarbons. For example the process may be used with hydrocarbon mixtures such as are obtained as residual gases in reactions of paraffin-olefin mixtures in which only part of the olefins has been reacted without change of the paraffins.

For example normal butane may be first exposed in the presence of hydrogen halide, advantageously hydrogen chloride, to temperatures above 500° C. under such conditions that a mixture of about 80 per cent of normal butane and 20 per cent of normal butylene is formed. The ratio in which the paraffin is split into olefin and hydrogen may be higher, e. g. 60 to 40 or 50 to 50, provided that care is taken to prevent splitting of the carbon chain. This is then treated in the cold with such an amount of chlorine as is insufficient for the formation of dichlorbutane with the butylene present, whereby it is avoided that the chlorination proceeds also with the formation of substitution products. The gas mixture remaining after the separation of the dichlorbutane often contains, in addition to large amounts of normal butane, such small amounts of butylene that a further working up of the butylene is difficult and expensive. This final gas may therefore be exposed to high temperatures again together with hydrogen halide and if desired with further fresh normal butane in order to produce a butane-butylene mixture having a satisfactory butylene content.

The reaction is preferably effected by leading a mixture of the initial hydrocarbons with hydrogen halide through empty heated vessels, in particular tubes. Since the reaction is endothermic, it is preferable to use metallic reaction vessels, as for example tubes of cast steel, in order to be able to supply well the amount of heat necessary for the dehydrogenation. The reaction temperatures lie above 500° C., generally speaking between 550° and 700° C., but below the temperature at which appreciable decomposition with the splitting up of the carbon chain takes place. As already mentioned, the time during which the reaction mixture remains in the reaction chamber or, in other words, is exposed to high temperatures should be so short that not all of the paraffin is converted. The higher the temperature, the higher may be the speed of flow.

The favorable action of the hydrogen halide is even noticeable when the additions correspond to a ratio of from 1 to 10 molecules of hydrogen halide to 1 molecule of paraffin. Larger amounts of hydrogen halide may also be added, but this offers no advantage as compared with the above-mentioned ratio, because the yields per unit of time and space fall with increasing hydrogen halide content of the initial mixture.

The proportion of olefin in the olefin-paraffin mixtures obtained according to this invention may be further increased by adding free halogen during the dehydrogenation in order to bind the hydrogen formed in the form of hydrogen halide. The amount of halogen should at the most be equimolecular to the amount of hydrogen split off; it may be less, however, so that only a part of the hydrogen is bound.

The halogen, preferably chlorine, serving for binding the hydrogen is added to the reaction mixture at a point where hydrogen has already been split off; the halogen, if desired in admixture with hydrogen halide, is therefore led into the reaction zone itself. The amount of halogen to be used in each case depends on the conversion of paraffins to olefins, which may be different according to the reaction conditions. The necessary amount of halogen may readily be determined by a preliminary experiment or also during the dehydrogenation. In the latter case halogen may be introduced in a slowly increasing amount and the fall in the hydrogen content of the final gas observed. When there is practically no longer any hydrogen in the final gas, the maximum addition of halogen has been reached; if the amount of halogen exceeds this amount, by-products are formed and this is undesirable.

If the amount of halogen introduced during the dehydrogenation be selected so that it is less than corresponds to the hydrogen split off, it is especially simple to ensure that undesirable by-products, in particular halogen-hydrocarbons, are not formed and that nevertheless the olefin content of the final gas is higher than without the co-employment of halogen.

By heating normal butane with a mixture of hydrogen chloride and chlorine (for example from 5 to 15 per cent of chlorine calculated on butane) under conditions under which in the absence of chlorine a butane-butylene mixture containing about 20 per cent of butylene is obtained, the yield of butylene may be increased for example to 38 per cent. The added chlorine is all present as hydrogen chloride. Free hydrogen is also obtained.

The reaction gases may be worked up very simply; for example the hydrogen chloride may first be removed by treatment with aqueous, for example 20 per cent, hydrochloric acid, the olefins recovered as such from the residual gas or, as already mentioned, subjected to further reactions in which the paraffin is not attacked, the recovered paraffin, which may still contain olefins, then being dehydrogenated according to this invention. The absorbed hydrogen chloride may be expelled again from the hydrochloric acid used for the washing by simple heating and then used again as diluent gas.

The following examples will further illustrate how the said invention may be carried out in practice but the invention is not restricted to these examples.

Example 1

The vapors of 500 grams of normal butane mixed with 1500 grams of dry hydrogen chloride are led per hour through a cast steel tube 2 metres long and 60 millimetres in internal diameter which is heated to 650° C. The gas leaving the tube is washed in a tower with 20 per cent aqueous hydrochloric acid at ordinary temperature and thus freed from hydrogen chloride. The residual gas is cooled to 80° below zero C., whereby 485 grams of a liquid are obtained which consists to the extent of about 80 per cent of normal butane and to the extent of about 20 per cent of normal butylene. The non-condensable portion of the gas consists of butane, butylene and hydrogen and also hydrocarbons having a lower carbon number.

In this way the reaction may be carried out continuously in the same tube for a long time without trouble.

Example 2

500 grams of normal butane are led per hour through a cast steel tube 2 metres long and 60 millimetres in internal diameter which is heated to 650° C. Into the reaction chamber there is blown a mixture of 1500 grams of hydrogen chloride and 90 grams of chlorine per hour. The gas leaving the reaction chamber is washed with 20 per cent aqueous hydrochloric acid at ordinary temperature whereby 1594 grams of hydrogen chloride are recovered. The residual gas is cooled to 80° below zero C., whereby 355 grams of a liquid are obtained which consists of 62 per cent of normal butane and 38 per cent of isobutylene. 100 litres of the gas are not condensed; this contains, in addition to hydrogen, about 140 grams of the butane-butylene mixture of the said composition. The yield amounts to 188 grams of butylene for 500 grams of introduced butane, with a yield of 99 per cent calculated on converted butane.

If the normal butane-butylene mixture thus obtained be subjected to a treatment with mineral acid, the butylene may be removed and converted into secondary butyl alcohol.

Example 3

490 grams of normal butane mixed with 2630 grams of hydrogen chloride are led per hour through an empty cast steel tube 2 metres long and 60 millimetres in internal diameter which is heated to 580° C. Into the hot zone of the tube there are led through a narrow tube ending in the middle of the tube 200 grams of chlorine gas per hour which is mixed with 1000 grams of hydrogen chloride. The gas mixture leaving the reaction tube is washed in a tower with water or 20 per cent hydrochloric acid and thus freed from hydrogen chloride. There are thus separated 3836 grams of hydrogen chloride per hour. The residual gas is cooled to 80° below zero C., whereby 460 grams of a condensate are obtained consisting of 33 per cent of butylene and 67 per cent of butane. The yield of butylene is 95 per cent with reference to reacted butane.

What we claim is:

1. A process for the production of paraffin-olefin mixtures which consists in leading a gaseous mixture of paraffin hydrocarbons containing at least two carbon atoms with at least an equimolecular amount of a hydrogen halide through a vessel heated to temperatures exceeding 500° C. but below those at which appreciable decomposition with the splitting up of the carbon chain takes place and maintaining the rate of throughput of said mixture so high that only part of the paraffin hydrocarbon is dehydrogenated.

2. A process for the production of paraffin-olefin mixtures which consists in leading a gaseous mixture of paraffin hydrocarbons containing at least two carbon atoms with at least an equimolecular amount of hydrogen chloride through a vessel heated to temperatures exceeding 500° C. but below those at which appreciable decomposition with the splitting up of the carbon chain takes place and maintaining the rate of throughput of said mixture so high that only part of the paraffin hydrocarbon is dehydrogenated.

3. A process for the production of butane-butylene mixtures which consists in leading a gaseous mixture of butane with at least an equimolecular amount of hydrogen chloride through a vessel heated to temperatures exceeding 500° C. but below those at which appreciable decomposition with the splitting up of the carbon chain takes place and maintaining the rate of throughput of said mixture so high that only part of the butane is dehydrogenated.

4. A process for the production of butane-butylene mixtures which consists in leading a gaseous mixture of butane with at least an equimolecular amount of hydrogen chloride through a vessel heated to temperatures exceeding 500° C. but below those at which appreciable decomposition with the splitting up of the carbon chain takes place with such a speed that only part of the butane is dehydrogenated, while simultaneously introducing an amount of free chlorine, at most equimolecular to the amount of hydrogen split off into a point within the vessel where hydrogen has already been split off.

ADOLF CANTZLER.
HANS KREKELER.